US011166129B2

(12) United States Patent
Gehani et al.

(10) Patent No.: US 11,166,129 B2
(45) Date of Patent: Nov. 2, 2021

(54) SYSTEMS AND METHODS FOR HANDLING INCOMING TELEPHONE CALLS

(71) Applicant: VONAGE BUSINESS INC., Atlanta, GA (US)

(72) Inventors: Jaya Gehani, Morganville, NJ (US); Shay Ben Yacov, Tel Aviv (IL)

(73) Assignee: Vonage Business, Inc., Atlanta, GA (US)

( * ) Notice: Subject to any disclaimer, the term of this patent is extended or adjusted under 35 U.S.C. 154(b) by 0 days.

(21) Appl. No.: 16/419,109

(22) Filed: May 22, 2019

(65) Prior Publication Data

US 2020/0374667 A1 Nov. 26, 2020

(51) Int. Cl.
| | |
|---|---|
| H04W 4/16 | (2009.01) |
| H04M 7/00 | (2006.01) |
| H04W 68/00 | (2009.01) |
| H04L 12/28 | (2006.01) |
| H04M 3/42 | (2006.01) |
| H04M 3/436 | (2006.01) |

(52) U.S. Cl.
CPC ............ *H04W 4/16* (2013.01); *H04M 7/006* (2013.01); *H04W 68/005* (2013.01); *H04L 12/2801* (2013.01); *H04M 3/42059* (2013.01); *H04M 3/42314* (2013.01); *H04M 3/436* (2013.01); *H04M 7/009* (2013.01); *H04M 2207/18* (2013.01); *H04M 2207/20* (2013.01)

(58) Field of Classification Search
CPC ......... H04M 2207/18; H04M 2207/20; H04M 3/42314; H04M 3/436; H04M 7/009; H04M 7/006; H04W 4/16; H04W 68/005
See application file for complete search history.

(56) References Cited

U.S. PATENT DOCUMENTS

| 8,582,733 | B1 * | 11/2013 | Larson | H04M 11/00 |
| | | | | 379/93.01 |
| 2002/0132638 | A1 * | 9/2002 | Plahte | H04M 1/72519 |
| | | | | 455/555 |

(Continued)

FOREIGN PATENT DOCUMENTS

EP 0 963 093 A2 12/1999

OTHER PUBLICATIONS

International Search Report for PCT/US2020/033963 dated Aug. 27, 2020.
Written Opinion for PCT/US2020/033963 dated Aug. 27, 2020.

*Primary Examiner* — Jaime M Holliday
(74) *Attorney, Agent, or Firm* — FisherBroyles, LLP; Joseph Pagnotta

(57) ABSTRACT

Systems and methods for handling an incoming telephone call received at a private branch exchange system and directed to an employee enable an actual or virtual receptionist to camp the call on the employee's extension. When the call is camped on the employee's extension, the private branch exchange system causes a push notification to be sent to a telephony device used by the employee to notify the employee that a call is camped on his extension. Such a push notification may also inform the employee about how many calls are camped on his extension. Further, such a push notification may provide the employee with information about the identity of a calling party whose call is camped on the employee's extension.

24 Claims, 4 Drawing Sheets

(56) References Cited

U.S. PATENT DOCUMENTS

| | | | |
|---|---|---|---|
| 2003/0133558 A1* | 7/2003 | Kung | H04L 12/2801 |
| | | | 379/215.01 |
| 2011/0281580 A1* | 11/2011 | Tonogai | H04M 3/42314 |
| | | | 455/426.1 |
| 2013/0343230 A1* | 12/2013 | Manyakin | H04W 4/16 |
| | | | 370/259 |
| 2016/0156775 A1* | 6/2016 | Waisel | H04M 1/72583 |
| | | | 455/411 |

* cited by examiner

SYSTEMS AND METHODS FOR HANDLING INCOMING TELEPHONE CALLS

BACKGROUND OF THE INVENTION

The invention is related to private branch exchange telephony systems that are used by businesses to direct incoming telephone calls to individual employees of the business. More particularly, the invention is related to ways of handling one or more incoming telephone calls that are directed to a party that is already engaged in an ongoing telephone call.

Many private branch exchange telephony systems provide a receptionist with the ability to determine whether an employee is presently using his telephony device to conduct an ongoing call. If the receptionist receives an incoming call directed to an employee that is already engaged in an ongoing telephone call, the receptionist can so inform the caller, and offer to take a message, or direct the caller to a voicemail system where the caller can leave a voice message for the employee they were trying to reach.

Additionally, private branch exchange systems also offer a "call camp" functionality. Under the call camp functionality, when a receptionist receives an incoming telephone call directed to an employee that is already engaged in an ongoing telephone call, the receptionist can "camp" the incoming call on the employee's extension. Essentially, the caller is placed on hold until the employee finishes his ongoing telephone call. When the employee's ongoing telephone call ends, the camped call is automatically processed like a regular incoming telephone call directed to the employee's extension. Thus, the employee's telephony device will begin ringing, and when the employee answers the call, the employee's telephony device is connected to the incoming call that was previously camped on the employee's extension.

In some private branch exchange systems, multiple incoming calls can be camped on an employee's extension. Typically, the calls are connected to the employee's telephony device in the order in which they are received.

Unfortunately, when one or more incoming calls are camped on an employee's extension, the employee is not aware that there are incoming calls waiting for this attention. Also, when a call is camped on the employee's extension, the employee has no way of knowing who the calling party is.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

The following description will also refer to telephone calls, telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 1:
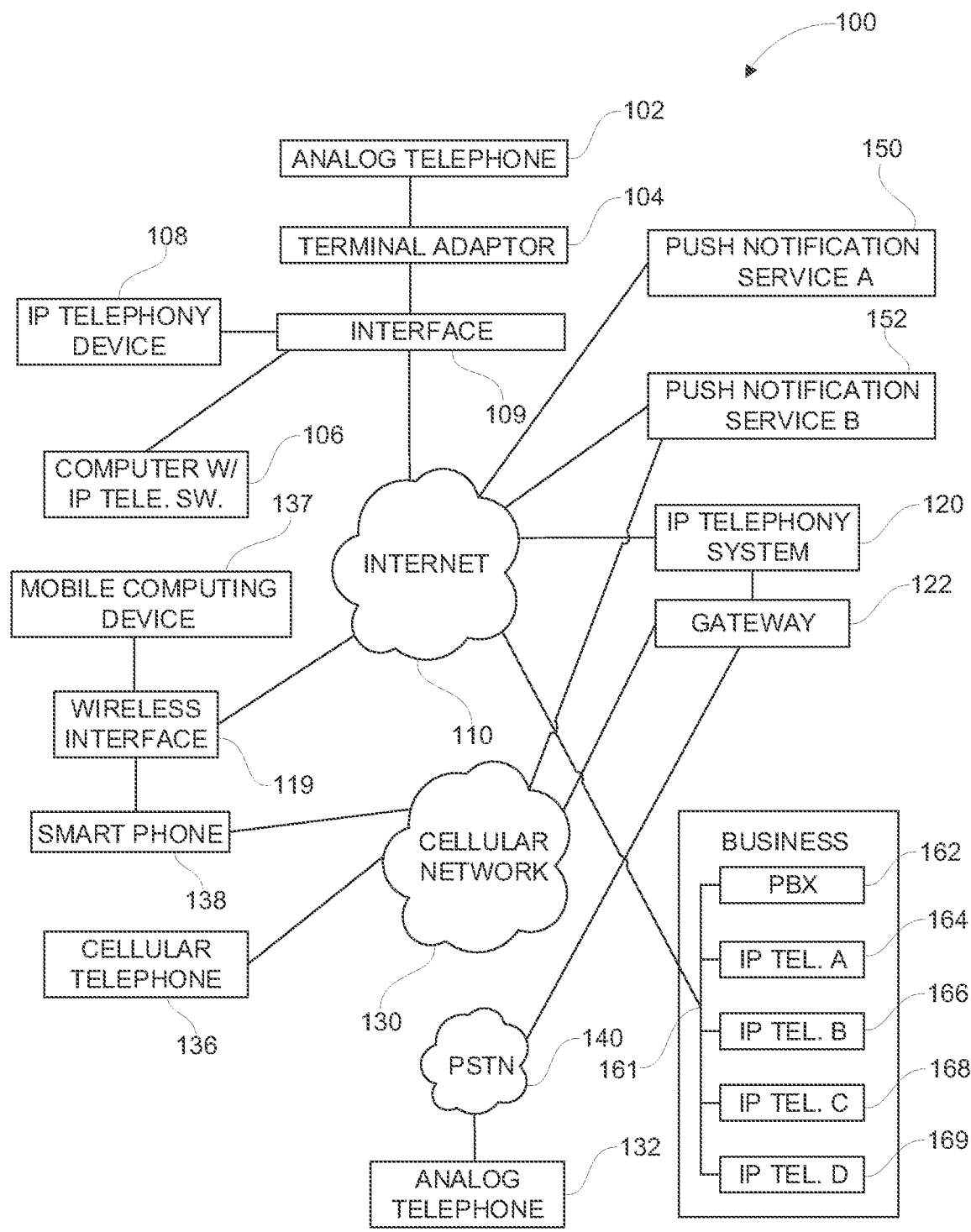
FIG. 1 is a diagram of a communications environment which could be utilized to perform methods embodying the invention.

Before describing systems and methods embodying the invention, we will first discuss a communications environment 100, as illustrated in FIG. 1, in which the systems and methods could be provided. In this communications environment 100, an IP telephony system 120 enables connection of telephone calls between its own customers and other parties via data communications that pass over a data network 110. The data network 110 is commonly the Internet, however, private data networks may form all or a portion of the data communication path. The IP telephony system 120 is connected to the Internet 110. In addition, the IP telephony system 120 is connected to both a publicly switched telephone network (PSTN) 140 and a cellular telephony network 130 via one or more gateways 122.

The gateway 122 allows users and devices that are connected to the PSTN 140 and cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephony device 108 that is connected to the Internet 110 via an interface 109. Such an IP telephony device 108 could be connected to an Internet service provider via a wired connection or via a wireless router.

Alternatively, a customer could utilize a normal analog telephone 102 which is connected to the Internet 110 via a terminal adapter 104 and the interface 109. The terminal adapter 104 converts analog signals from the telephone 102 into digital data signals that pass over the Internet 110, and vice versa. Analog telephony devices include, but are not limited to, standard telephones and document imaging devices such as facsimile machines.

In addition, a customer could utilize a telephony software application running on a computer 106 to place and receive IP based telephone calls, and to access other IP telephony systems (not shown). In some instances, the telephony software application could be assigned its own telephone number. In other instances, the telephony software application could be associated with a telephone number that is also assigned to an IP telephone 108, or to a terminal adaptor 104 that is connected to one or more analog telephones 102.

Likewise, a mobile computing device 137 may be used to send and receive telephony communications via the IP telephony system 120. The mobile computing device 137 could establish a data connection to the Internet 110 via a wireless interface 119, such as a WiFi router. IP telephony software on the mobile computing device 137 could then be used to conduct telephony communications through the IP telephony system 120.

A third party using an analog telephone 132 which is connected to the PSTN 140 may call a customer of the IP telephony system 120. In this instance, the call is initially connected from the analog telephone 132 to the PSTN 140, and then from the PSTN 140, through the gateway 122 to the IP telephony system 120. The IP telephony system 120 then routes the call to the customer's IP telephony device. Likewise, a third party using a cellular telephone 136 could also place a call to an IP telephony system customer, and the connection would be established in a similar manner, although the first link would involve communications between the cellular telephone 136 and a cellular telephony network 130.

In addition, a smartphone 138 that includes both mobile computing capabilities and cellular telephony capabilities can connect to the cellular network 130 using its cellular telephone capabilities. However, the smartphone 138 also may establish a data connection to the IP telephony system 120 via a wireless interface 119 and the Internet 110. In this instance, communications between the smartphone 138 and other parties could be entirely carried by data communications. Of course, alternate embodiments could utilize any other form of wired or wireless communications path to enable communications.

Users of the IP telephony system 120 are able to access the service from virtually any location where they can connect to the Internet 110. Thus, a customer could register with an IP telephony system provider in the U.S., and that customer could then use an IP telephony device 108 located in a country outside the U.S. to access the services. Likewise, the customer could also utilize a computer with IP telephony software 106 or a mobile computing device with IP telephony software 137 outside the U.S. to access the IP telephony system 120. Further, in some instances a user could place a telephone call with the analog telephone 132 or the cellular telephone 136 that is routed through the PSTN 140 or cellular network 130, respectively, to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system's network. Thus, the user is able place a long distance call using lower cost IP telephony service provided by the IP telephony system 120, rather than a higher cost service provided by the PSTN 140 or cellular network 130.

The communications environment 100 also includes push notification service A 150 and push notification service B 152. The push notification services 150/152 are responsible for sending push notifications to user telephony devices. Examples of such push notification services include the Apple Push Notification Service (APNS), the Google Cloud Messaging (GCM) service and the Firebase Cloud Messaging service (FCM). Typically, an entity that wishes to cause a push notification service to send a push notification to a user's telephony device must obtain a token from the user that includes the user's credentials. The entity requesting that a push notification be sent to a user's telephony device must provide the user's token along with the request for a push notification.

The communications environment 100 also includes a private branch exchange system 162 that may be configured to provide telephony service to a business 160. The private branch exchange system 162 is an IP-based system that is connected to a data network 161 resident in the business. IP telephony devices A-D 164/166/168/169 are also connected to the business' data network 161. The private branch exchange 162 connects incoming and outgoing calls between the IP telephony devices A-D 164/166/168/169 and the IP telephony system 120. In some instances, the private branch exchange system 162 also may route calls directly to and from the cellular network 130 or a PSTN 140 via the Internet 110. The private branch exchange system 162 may be located on-site at the business 160 or it may be located off-site as part of a cloud-based communication system or network.

The private branch exchange system 162 allows businesses with high call volume to handle incoming calls efficiently and productively. In most cases, a receptionist manages this call handling function via some type of interface. The subject invention includes a Receptionist Console that provides a full set of call features that help users (such as those making/receiving calls from IP telephony devices A-D 164/166/168/169) and the receptionist minimize the amount of time it takes to handle each call and reduce the number of dropped calls. In one embodiment, the console is a graphical user interface displayed on a desktop computer running appropriate VoIP PBX telephony software within the business 160.

The IP telephony devices A-D 164/166/168/169 used in a business and served by the private branch exchange system 162 could take many different forms. In some instances, an IP telephony device could be a dedicated IP telephone that is connected to the business's data network 161 via a wired or wireless connection. An IP telephony device could also take the form of a telephony software application running on a user's laptop or desktop computer. In still other instances, an IP telephony device could take the form of a telephony software application running on a user's smartphone or mobile computing device.

In the foregoing and following descriptions, references are made to an "IP telephony device." This term is used to refer to any type of device which is capable of interacting with an IP telephony system 120 to conduct or participate in an IP telephony communication. An IP telephony device could be an IP telephone, a computer running IP telephony software, a telephone adaptor which is connected to an analog telephone, or some other type of device capable of communicating via data packets. An IP telephony device could also be a cellular telephone, a smartphone, or a portable or tablet computing device that runs a telephony software application that enables the device to act as an IP telephony device. Such telephony software applications are available at digital distribution platforms such as the App Store by Apple Inc. of Cupertino, Calif. and the Google Play Store (formerly the Android Market) by Google Inc. of Menlo Park, Calif. Thus, a single device might be capable of operating as both a cellular telephone and an IP telephony device.

Moreover, certain devices that are not traditionally used as telephony devices may act as telephony devices once they are configured with appropriate telephony software. Thus, some devices that would not normally be considered telephony devices may become telephony devices or IP telephony devices once they are running appropriate software. One example would be a desktop or a laptop computer that is running a telephony software application that can interact with an IP telephony system over a data network to conduct telephone calls. Another example would be a portable computing device, such as an Apple iPad™, which includes a speaker and a microphone. A software application loaded onto an Apple iPad™ can be run so that the Apple iPad™ can interact with an IP telephony system to conduct a telephone call.

Figure 2:
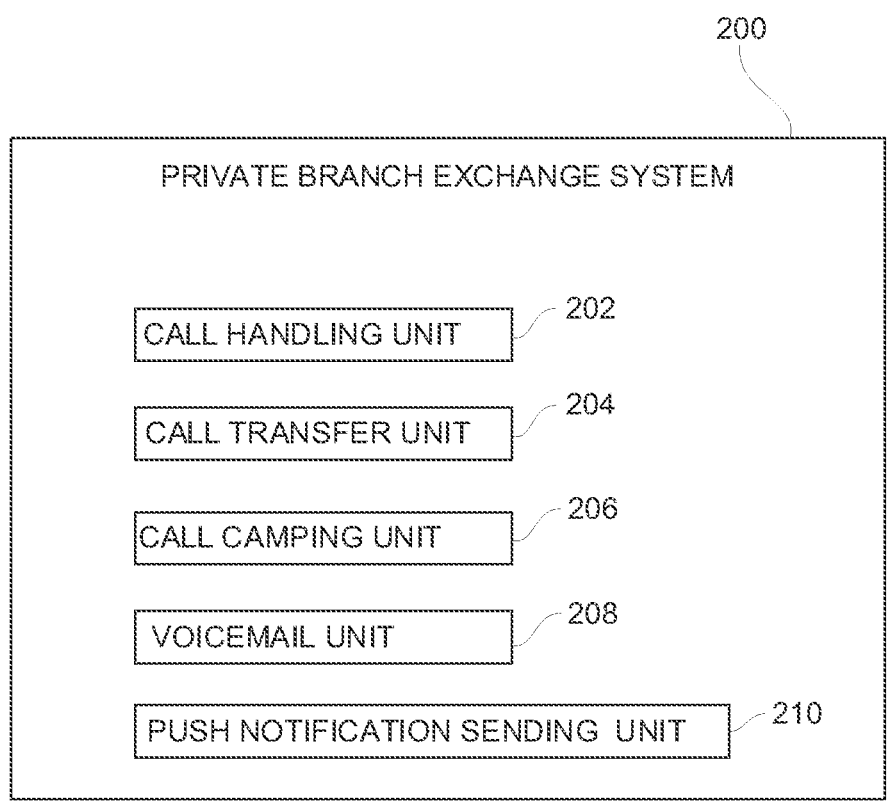
FIG. 2 is a diagram of a private branch exchange system embodying the invention.

With the foregoing background, we now turn to a description of selected elements of an IP-based private branch exchange (PBX) system 162, as illustrated in greater detail in FIG. 2. The PBX system 162 includes a call handling unit 202 that is responsible for receiving and processing call setup requests. This includes call setup requests received from parties outside the business who are trying to reach employees of the business, as well as call setup requests received from employee telephony devices where an employee is trying to reach another employee of the business, or a party outside the business. In some embodiments, Session Initiation Protocol (SIP) is used by the PBX system 162 to receive and process call setup requests. In other embodiments, alternate protocols may be used.

The PBX system 162 also includes a call transfer unit 204. The call transfer unit 204 enables a first telephony device connected to the PBX system that has established a call connection with another telephony device to transfer the call to another telephony device connected to the PBX system. As an example, a party outside the business could place a call to a main telephone number of the business, and a receptionist using a first telephony device connected to the PBX system 162 could answer the call. Once the receptionist learns who the calling party wishes to speak to, the receptionist could transfer the call to a second telephony device connected to the PBX system 162 that is used by the employee the calling party wishes to speak to. The call transfer unit 204 would effect the transfer of the call from the receptionist's telephony device to the telephony device of the employee the calling party wishes to speak to.

The PBX system 162 also includes a call camping unit 206. As mentioned above, an incoming call can be placed in a "camped on" status of an employee's extension when the employee is already engaged in an ongoing telephone call. Under this scenario, a receptionist could receive an incoming telephone call from a calling party that is attempting to reach the employee. When the receptionist learns the identity of the employee the calling party is attempting to reach, the receptionist could check to determine if the telephony device used by the employee is already in use because the employee is already engaged in an ongoing telephone call. If so, the receptionist could ask the calling party if they wish to wait until the calling party ends his current call, or if the calling party would like to be routed to a voicemail system so that the calling party can leave a message for the employee. If the calling party wishes to wait, the receptionist "camps" the call on the employee's extension. The call camping unit 206 effects this functionality.

A call that has been camped on an employee's extension is essentially on hold until the employee ends the ongoing call. When the employee finishes his ongoing call, the call camping unit 206 processes the call like a call transfer to the employee's telephony device, or like any other incoming call directed to the employee's telephony device. The call camping unit 206 can be configured to keep multiple calls camped on an employee's extension. Typically, the first call to be camped on an employee's extension will be the first call connected to the employee's telephony device when the employee finishes his ongoing call. However, when multiple calls are camped on an employee's extension, the call camping unit 206 may allow the calls to be reordered such that the second call to be camped on the employee's extension is the first call that is connected to the employee's telephony device when the employee's ongoing telephone call ends.

The re-ordering of calls camped on an employee's extension may be accomplished via a user interface. In one embodiment of the invention, a "drag and drop" operation is performed at a Receptionist Console of one of the business' desktop telephony software applications. The "drag and drop" operation enables the user of the Receptionist Console to drag (e.g., mouse clik&hold) one or more camped calls on a particular employee's extension into a new position in the listing of camped calls and drop (e.g. mouse unclick/release) the camped call so that the camped calls have been re-ordered.

As will be explained in greater detail below, the call camping unit 206 may also be configured such that when the call camping unit 206 camps a call on an employee's extension, the call camping unit 206 also causes a push notification to be sent to a telephony device used by the employee to notify the employee that a call has been camped on the employee's extension. Such a push notification may also inform the employee of how many calls are camped on his extension. Further, the push notification may provide the employee with identity information relating to the calling party that has been camped on the employee's extension.

The PBX system further includes a voicemail unit 208. If a calling party is unable to reach a desired employee because they are already on an ongoing call, or because the employee is not otherwise available, the calling party may be connected to a voicemail unit 208 that records the calling party's audio message for the employee. If the calling party originally called a main number for the business and was connected to a receptionist, the receptionist may use the call transfer unit 204 to transfer the calling party to the voicemail unit 208. In other instances, such as when the calling party dialed a direct telephone number for the employee, the call handling unit 202 may automatically connect the calling party to the voicemail system 208 when the employee fails to answer the incoming telephone call.

The PBX system also includes a push notification sending unit 210. The push notification sending unit 210 is not itself responsible for sending a push notification to a telephony device. Instead, the push notification sending unit 210 is responsible for interacting with a push notification service 150/152, as shown in FIG. 1, to request that a push notification service 150/152 send a push notification to a user's telephony device. In some instances, it may be necessary for the push notification sending unit 210 to first obtain push notification service credentials from the user's telephony device so that the user's push notification service credentials can be included with a push notification request sent to one of the push notification services 150/152.

Figure 3:
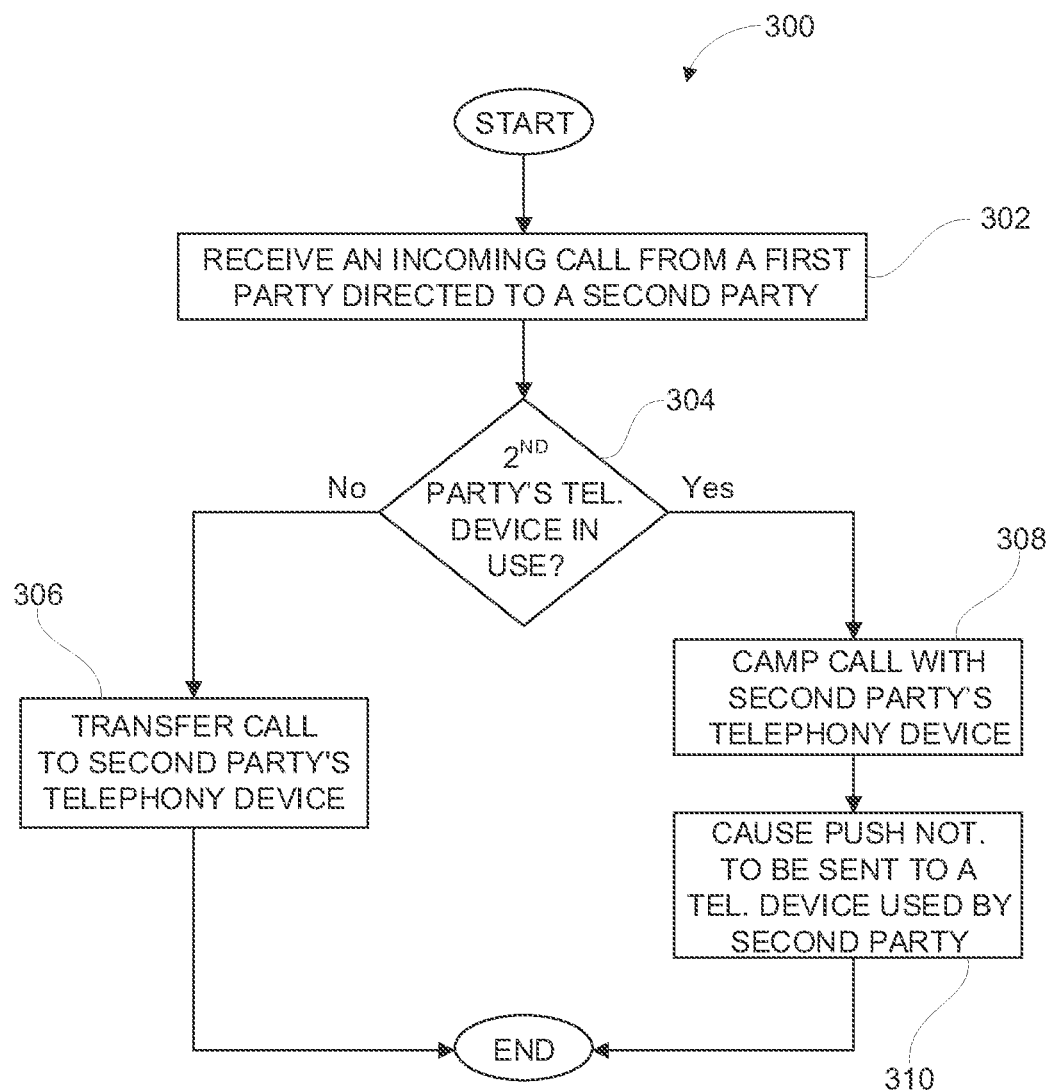
FIG. 3 is a flowchart illustrating steps of a method embodying the invention.

We will now turn to a description of a method embodying the invention, as illustrated in the flow chart provided in FIG. 3. During this method, an incoming call directed to an employee of a business is camped on the employee's extension because the employee is currently engaged in an ongoing telephone call.

The method 300 begins and proceeds to step 302 where an incoming call is received at a PBX system 162 of a business 160. The incoming call is from a first party, and the first party is attempting to reach a second party who is an employee of the business and who uses an IP telephony device connected to the business' PBX system 162. If the call is directed to a main telephone number for the business, the call handling unit 202 connects the call to a live or virtual receptionist. Alternatively, if the incoming call is directed to a direct line telephone number assigned to the second party's telephone device, and the call is not answered by second party after a predetermined period of time (because the second party is already engaged in an ongoing telephone call), the call handling unit 202 re-directs the call to a live or virtual receptionist.

The first party then informs the live or virtual assistant of the identity of the second party that the first party is trying to reach. Alternatively, if the first party dialed a direct line telephone number assigned to the second party's telephone device, and the second party did not answer such that the incoming call was re-directed to the live or virtual receptionist, the call handling unit 202 may already be aware of who the first party is trying to reach. In any event, the live or virtual receptionist then checks the status of the second party's telephony device to determine if it is currently in use.

At step 304, the method determines whether or not the second party's phone is in use. If the second party's telephony device is not in use, the method proceeds to step 308, where the call transfer unit 204 connects the call to the second party's telephony device. The method would then end.

If the live or virtual receptionist determines that the second party's telephony device is in use during step 304, the live or virtual assist so informs the first party, and then asks the first party if the first party would like to hold until the second party is free. If the first party is willing to wait for the second party to become free, the method proceeds to step 308 where the call camping unit 206 camps the call on the second party's extension. Next, in step 310, the call camping unit 206 instructs the push notification sending unit 210 to cause a push notification to be sent to a telephony device used by the second party, and the push notification sending unit 210 causes such a push notification to be sent. As noted above, the push notification sending unit 210 would enlist the services of a push notification service 150/152 to actually send a push notification to a telephony device used by the second party to inform the second party that a call was just camped on the second party's extension.

The call camping unit 206 could pass various items of information to the push notification sending unit 210 that are to be included in the push notification that is ultimately sent to the second party's telephony device. Such information could include the number of calls that are now camped on the second party's extension. This information could also include identity information for the calling party or calling parties of any calls that are presently camped on the second party's extension. This information could also include the time at which the camped calls were received, and the wait time that has already elapsed for previously camped calls. For a particular camped call, this information could include historical information, such as the last date/time that a call was received from the same telephone number, the number of times that calls have been received from the same telephone number, as well as other historical information.

The push notification could be sent to same telephony device that is connected to the PBX system 162 and that the second party uses to receive telephone calls via the PBX system 162. Alternatively, the push notification could be sent to an alternate telephony device that is used by the second party.

For example, if the second party uses a telephony software client running on a desktop or laptop computer to receive telephone calls via the PBX system, the push notification could be sent to that telephony software application. Alternatively, the push notification could be sent to a smartphone used by the second party, or to a telephony software application running on a smartphone used by the second party.

If the second party uses a dedicated IP telephone to receive telephone calls via the PBX system, the push notification could be sent to a telephony software application running on a desktop or laptop computer used by the second party, or the push notification could be sent to a smartphone used by the second party, or to a telephony software application running on a smartphone used by the second party.

In some embodiments, multiple push notifications could be sent to multiple telephony devices used by the second party.

The call camping unit 206 could determine which of the second party's telephony devices a push notification is to be sent to, and that information could be provided to the push notification sending unit 210 when the call camping unit 206 instructs the push notification sending unit 210 to send a push notification about one or more camped calls. Alternatively, the push notification sending unit 210 may decide which of the second party's telephony devices should receive a push notification about camped calls.

This also may be a user configurable option, and the user could specify which of his telephony devices are to receive push notifications about camped calls. Further, the user configurable options may also allow a user to specify what information is to be included in push notifications about camped calls.

Once any push notifications are sent in step 310, the method 300 depicted in FIG. 3 ends.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 4:
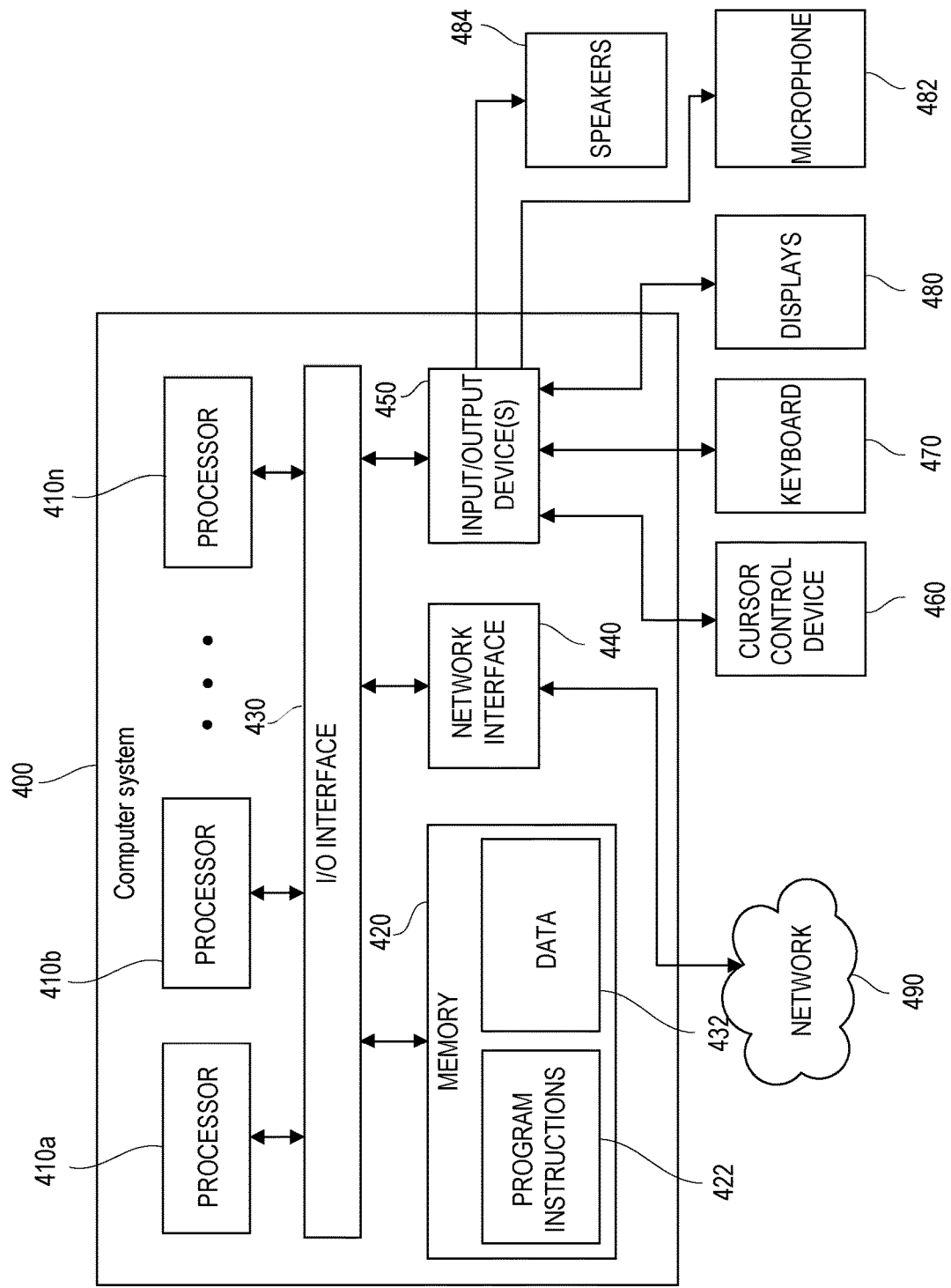
FIG. 4 is a diagram of a computer system and associated peripherals which could embody the invention, or which could be used to practice methods embodying the invention.

FIG. 4 depicts a computer system 400 that can be utilized in various embodiments of the present invention to implement the invention according to one or more embodiments. The various embodiments as described herein may be executed on one or more computer systems, which may interact with various other devices. One such computer system is the computer system 400 illustrated in FIG. 4. The computer system 400 may be configured to implement the methods described above. The computer system 400 may be used to implement any other system, device, element, functionality or method of the above-described embodiments. In the illustrated embodiments, the computer system 400 may be configured to implement the disclosed methods as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, display(s) 480, microphone 482 and speakers 484. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, the computer system 400 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Plash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the methods illustrated by the flowchart of FIG. 3. In other embodiments, different elements and data may be included.

Those skilled in the art will appreciate that the computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Although some of the foregoing descriptions referred to an IP telephony system, the same basic methods could also be accomplished by an alternate type of telephony system, such as a traditional analog telephony system or a cellular telephony system. Thus, the use of an IP telephony system for purposes of describing the invention should in no way be considered limiting. Systems and methods embodying the invention could also be implemented as part of an alternate type of telephony system.

In many of the foregoing descriptions, a software application running on a telephony device may perform certain functions related to the disclosed technology. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

Also, although many of the examples discussed above relate to telephony communications, those telephony communications could be audio or video calls, video conferences, or other forms of communications. The methods and techniques described above could be used to enable many different types of communications. Thus, the foregoing references to calls or telephony communications should in no way be considered limiting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of handling an incoming call from a first party that is directed to a second party and that has been received by an Internet protocol (IP) based private branch exchange telephony system, where a first telephony device used by the second party is engaged in an ongoing call when the incoming call is received, comprising:

transferring the incoming call to the first telephony device used by the second party in such a way that the incoming call will remain camped until the ongoing call is completed, at which point the second party's first telephony device will treat the incoming call as a new incoming call; and instructing a push notification service that is separate from the IP based private branch exchange system to send a push notification to a second telephony device used by the second party that is different from the first telephony device used by the second party, where the push notification informs the second party that the incoming call is currently camped.

2. The method of claim 1, wherein the second party's first telephony device is a standalone Internet protocol (IP) telephony device, and wherein the second telephony device used by the second party to which the push notification is sent comprises a telephony software application running on a computing device used by the second party.

3. The method of claim 1, wherein the second party's first telephony device is a first telephony software application running on a first computing device used by the second party, and wherein the second telephony device used by the second party to which the push notification is sent is a second telephony software application running on a second computing device used by the second party.

4. The method of claim 1, wherein the second party's first telephony device is one of an IP telephony device and a telephony software application running on a computing device used by the second party, and wherein the second telephony device used by the second party to which the push notification is sent comprises a smartphone used by the second party.

5. The method of claim 1, wherein the second party's first telephony device is one of an IP telephony device and a telephony software application running on a computing device used by the second party, and wherein the second telephony device used by the second party to which the push notification is sent comprises a telephony software application running on a smartphone used by the second party.

6. The method of claim 1, wherein instructing the push notification service to send a push notification to the second telephony device used by the second party comprises instructing the push notification service to send a push notification to two or more telephony devices used by the second party that are different from the first telephony device used by the second party.

7. The method of claim 1, wherein the push notification also informs the second party of how many incoming calls directed to the second party are currently camped.

8. The method of claim 1, wherein the push notification also provides information identifying the first party.

9. The method of claim 8, wherein the information identifying the first party comprises a telephone number of the first party.

10. The method of claim 8, wherein the information identifying the first party comprises a business name or an individual's name.

11. The method of claim 1, wherein the push notification will be delivered to an operating system of the second telephony device used by the second party.

12. A system for handling an incoming call from a first party that is directed to a second party and that has been received by an Internet protocol (IP) based private branch exchange telephony system, where a first telephony device used by the second party is engaged in an ongoing call when the incoming call is received, comprising:
  means for transferring the incoming call to the first telephony device used by the second party in such a way that the incoming call will remain camped until the ongoing call is completed, at which point the second party's first telephony device will treat the incoming call as a new incoming call; and
  means for instructing a push notification service that is separate from the IP based private branch exchange system to send a push notification to a second telephony device used by the second party that is different from the first telephony device used by the second party, where the push notification informs the second party that the incoming call is currently camped.

13. The system of claim 12, wherein the means for instructing a push notification service to send a push notification to the at least one telephony device causes the push notification service to send the push notification to an operating system of the second telephony device used by the second party.

14. A system for handling an incoming call from a first party that is directed to a second party and that has been received by an Internet protocol (IP) based private branch exchange telephony system, where a first telephony device used by the second party is engaged in an ongoing call when the incoming call is received, comprising:
  a call camping unit that is configured to transfer the incoming call to the first telephony device used by the second party in such a way that the incoming call will remain camped until the ongoing call is completed, at which point the second party's first telephony device will treat the incoming call as a new incoming call; and
  a push notification sending unit that is configured to instruct a push notification service that is separate from the IP based private branch exchange system to send a push notification to a second telephony device used by the second party that is different from the first telephony device used by the second party, where the push notification informs the second party that the incoming call is currently camped.

15. The system of claim 14, wherein the second party's first telephony device is a standalone Internet protocol (IP) telephony device, and wherein the second telephony device used by the second party to which the push notification is sent comprises a telephony software application running on a computing device used by the second party.

16. The system of claim 14, wherein the second party's first telephony device is a first telephony software application running on a first computing device used by the second party, and wherein the second telephony device used by the second party to which the push notification is sent is a second telephony software application running on a second computing device used by the second party.

17. The system of claim 14, wherein the second party's first telephony device is one of an IP telephony device and a telephony software application running on a computing device used by the second party, and wherein the second telephony device used by the second party to which the push notification is sent comprises a smartphone used by the second party.

18. The system of claim 14, wherein the second party's first telephony device is one of an IP telephony device and a telephony software application running on a computing device used by the second party, and wherein the second telephony device used by the second party to which the push notification is sent comprises a telephony software application running on a smartphone used by the second party.

19. The system of claim 14, wherein the push notification sending unit instructs the push notification service to send a push notification to two or more telephony devices used by the second party that are different from the first telephony device used by the second party.

20. The system of claim 14, wherein the push notification also informs the second party of how many incoming calls directed to the second party are currently camped.

21. The system of claim 14, wherein the push notification also provides information identifying the first party.

22. The system of claim 21, wherein the information identifying the first party comprises a telephone number of the first party.

23. The system of claim 21, wherein the information identifying the first party comprises a business name or an individual's name.

24. The system of claim 14, wherein the push notification sending unit causes the push notification service to send the push notification to an operating system of the second telephony device used by the second party.

* * * * *